March 3, 1942. E. A. DAVIES 2,275,397
ADJUSTING MEANS FOR AIR VALVES
Original Filed March 18, 1936

Inventor
Edwin A. Davies

Patented Mar. 3, 1942

2,275,397

UNITED STATES PATENT OFFICE 2,275,397

ADJUSTING MEANS FOR AIR VALVES

Edwin A. Davies, Waterbury, Conn., assignor to Hoffman Specialty Company, Waterbury, Conn., a corporation of Illinois Original application March 18, 1936, Serial No. 69,524. Divided and this application September 14, 1939, Serial No. 294,903

3 Claims. (Cl. 251—9)

This invention relates to air valves for use with steam radiators, the mains of steam heating systems, and in other analogous situations in which necessity may arise to release air from the radiators and piping of the system while preventing escape of steam and water. Its object is to provide as a part or adjunct of valves of this type, adjustable means whereby the pressure needed for expulsion of air, and the rate of discharge of air, may be adjusted and regulated.

The subject matter in which the present invention consists was originally disclosed in my application for United States patent Serial No. 69,524, filed March 18, 1936, now Patent No. 2,197,250, issued April 16, 1940, and the present application is a division of said prior application. This subject matter is fully and adequately described in the following specification in connection with a drawing illustrating a practical embodiment.

In the drawing.

Like reference characters designate the same parts wherever they occur in both figures.

Figures 1, 2:
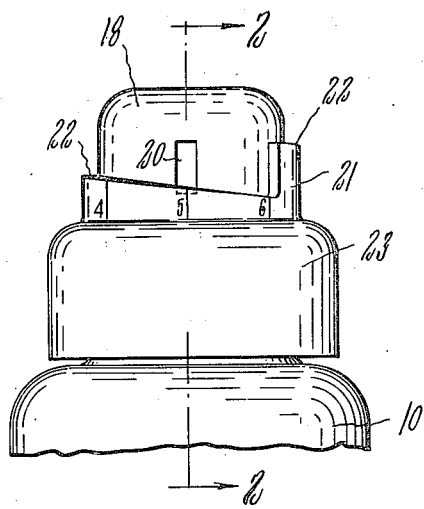
Fig. 1 is a side elevation of the venting end of a radiator valve equipped with the invention.
Fig. 2 is a sectional view of the same taken on line 2—2 of Fig. 1.

The air vent valve to which I have applied this embodiment of the invention is one of the type described in the patent of George D. Hoffman, No. 1,211,314, granted January 2, 1917. In the present drawing only the upper end of the valve is shown. It includes an outer casing having suitable means for connection with a steam radiator, or other receiver or conveyer of steam from which it may be necessary to release air. A plug fitting 12 secured in the upper end of the casing has a passage containing an outlet port 13 from which entrapped air may escape when the port is open. This fitting is, in effect, a projecting part of the valve casing, annular in cross section. A valve 14 operated by suitable float and thermostatic means is arranged to close against and withdraw from a valve seat 15 surrounding the inner end of port 13. Under low temperature conditions, and with a low level of water in the valve casing, the valve is opened, as shown in Fig. 2. But when water rises in the casing, or steam enters it, the valve is closed.

The foregoing description relates to the standard radiator valve of the type before referred to. The present invention is concerned with means for regulating the rate at which air passing through the port may escape to the atmosphere. Such means comprises a shell 18 having a discharge port 20 in its side, and a shutter or valve element 21 surrounding the shell and having a helical edge 22 so disposed as to overlap and occlude the port more or less according to adjustment of the shell and shutter relatively to one another angularly around the axis of the shell.

The shutter is made in one piece with a nut element 23 of larger internal diameter than the shutter, which meshes with the threads of an external shoulder 24 on the vent plug fitting 12. The combined shutter and nut element is provided with an internal shoulder 27 which overlaps an external flange 28 on the base of the shell. Said flange rests on the upper face of the threaded shoulder 24, and may be clamped tightly against the latter by the shoulder 27 when the nut 23 is screwed down.

In order to adjust the effective area of port 20, the nut is loosened sufficiently to permit rotation of the shell, which is then turned far enough to cause any desired proportion of the port to be covered by the helical margin 22 of the shutter, after which the nut is tightened to secure the adjustment. By virtue of the helical edge, a very fine and exact adjustment of the effective port area may be made. Marks or graduations of any suitable character to serve as a guide for setting the shutter to obtain any prescribed area of the port opening may be provided such, for example, as indicated in Fig. 1.

What I claim and desire to secure by Letters Patent is:

1. A means for regulating the rate of discharge of air from an air relief valve casing comprising a shell adapted to be mounted rotatably on such a valve casing surrounding the vent port thereof, said shell having a port in its side and an external flange adapted to bear against a shoulder on the valve casing, and a nut adapted to be screwed to the valve casing and having a shoulder overlapping said flange for clamping the shell against the valve casing shoulder, said nut having a shutter portion surrounding the shell and including a substantially helical edge located to overlap said shell port more or less in different positions of angular adjustment of the shell relatively to the nut and shutter combination.

2. A relief valve comprising a casing having a plug fitting containing an outlet passage and provided with a threaded external shoulder, a shell surrounding the outer end of said fitting enclosing a space into which said passage opens and having a lateral escape port, said shell bearing at its base on said shoulder and having an external flange, and a combined shutter and nut element in threaded connection with said shoulder, having an internal shoulder arranged to bear on said flange and clamp the shell in place, the shutter portion of said element being arranged to surround the shell closely and having a helical edge arranged to cover more or less of the port area in consequence of relative angular adjustments between the shell and shutter around the axis of the shell.

3. A relief valve comprising a casing having a projecting part of circular cross section, through which a passage opens, a shell surrounding, and having a rotative bearing on said projecting part enclosing the space adjacent to the external orifice of said passage, and having an elongated port in its side, and a shutter surrounding said shell formed with a port-occluding portion having a helical edge located and arranged to cover more or less of the area of said port in consequence of rotation of the shell; the shutter being in adjustable shell-clamping engagement with the casing and shell, whereby to secure the shell immovably with respect to the casing and to release the shell for permitting rotary adjustment thereof.

EDWIN A. DAVIES.